Sept. 25, 1951 W. J. JAMES ET AL 2,569,106
POSITION INDICATOR
Filed June 29, 1946 4 Sheets-Sheet 1
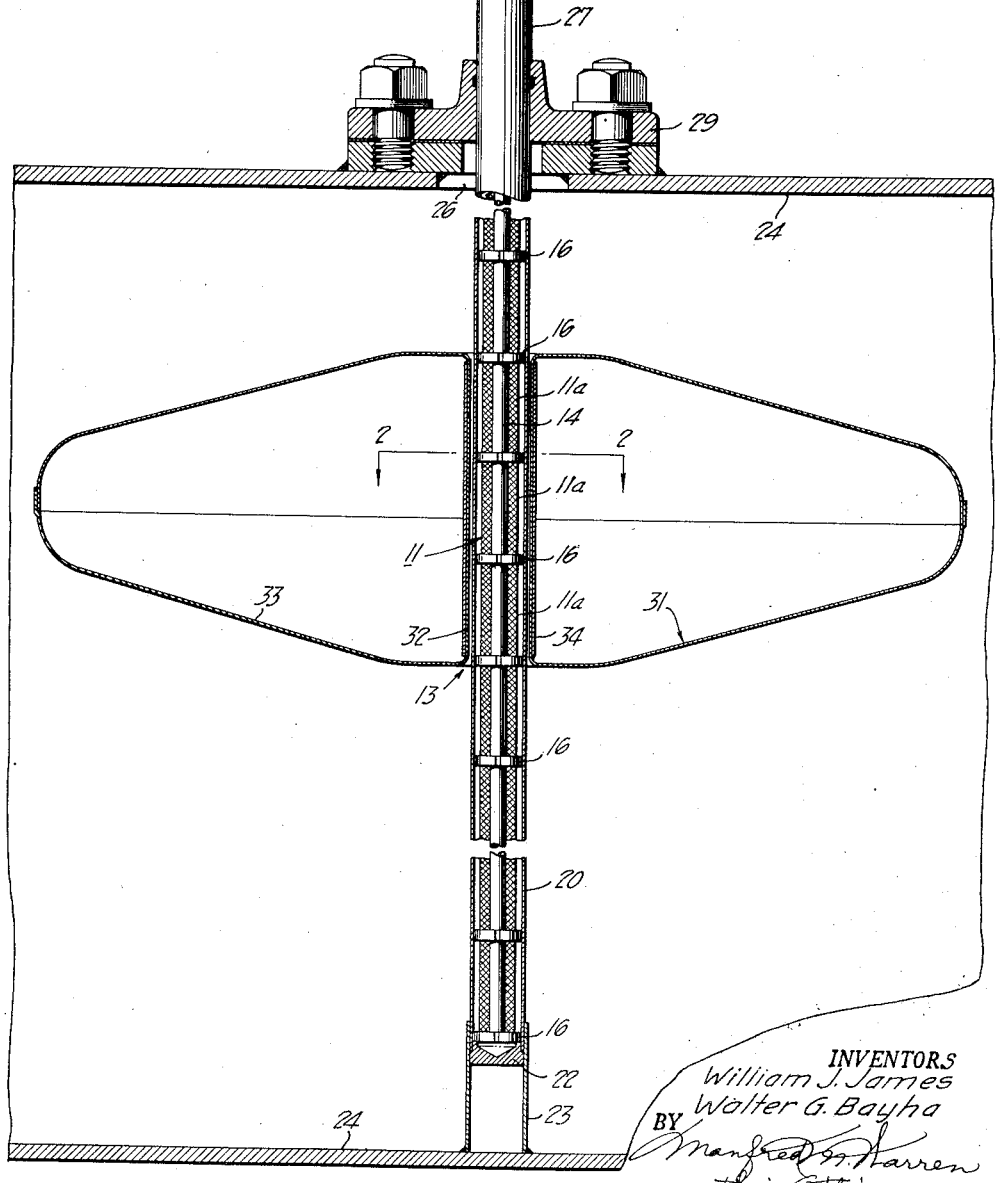
FIG_1_
INVENTORS
William J. James
Walter G. Bayha
BY
their Atty Sept. 25, 1951 W. J. JAMES ET AL 2,569,106
POSITION INDICATOR
Filed June 29, 1946 4 Sheets-Sheet 2
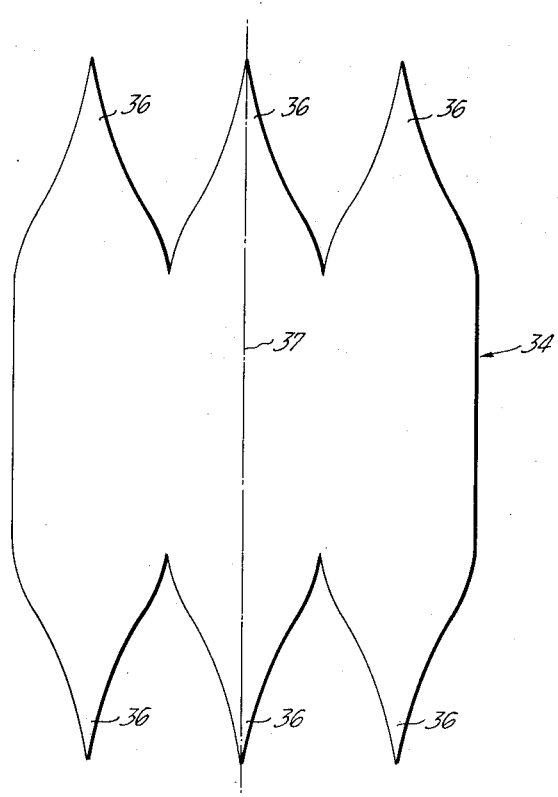
FIG_3_
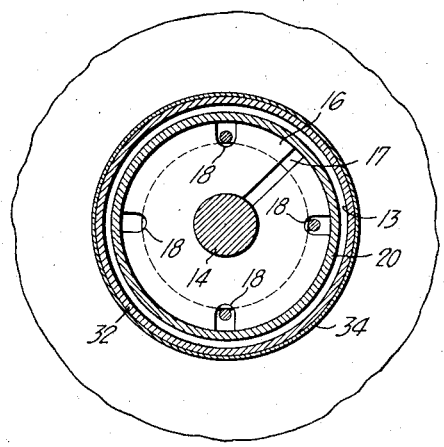
FIG_2_
INVENTORS
William J. James
Walter G. Bayha
BY
Manfred M. Warren
Their Atty.

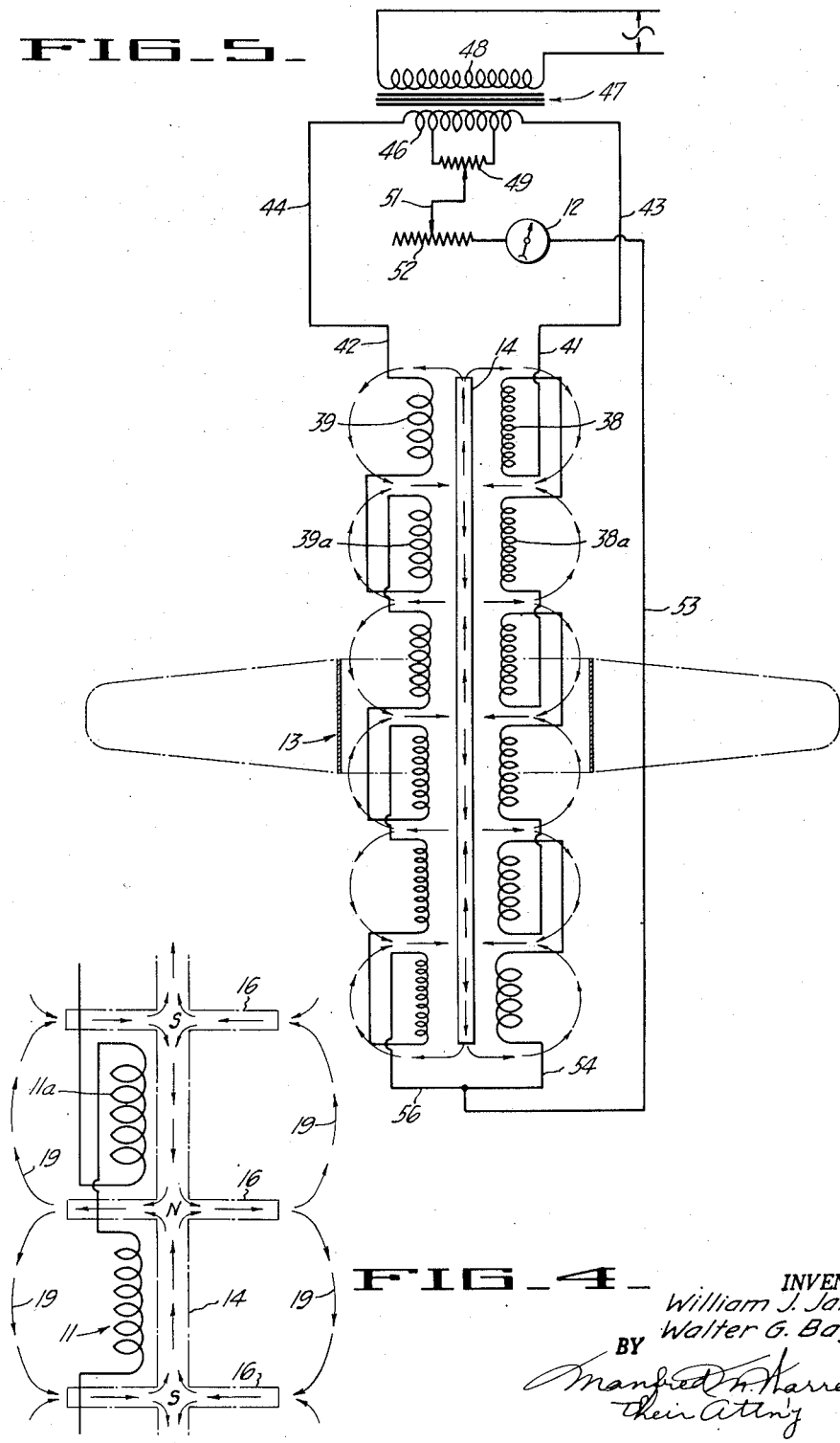

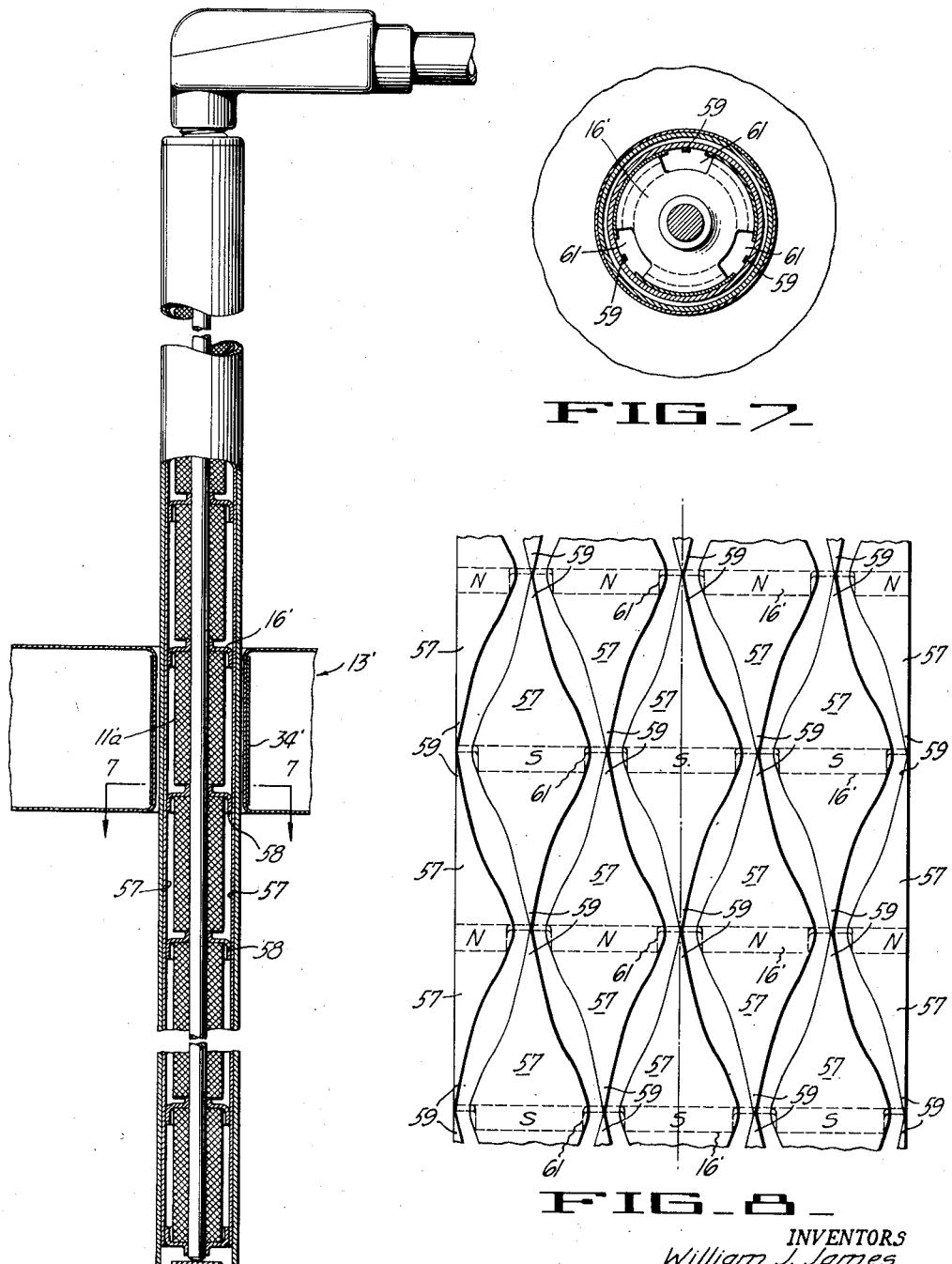

Patented Sept. 25, 1951

2,569,106

UNITED STATES PATENT OFFICE 2,569,106

POSITION INDICATOR

William J. James and Walter G. Bayha, Berkeley, Calif.; said Bayha assignor to said James Application June 29, 1946, Serial No. 680,496

10 Claims. (Cl. 171—242)

The invention relates to measuring and condition responsive instruments and mechanisms and particularly those adapted for indicating and responding to liquid level conditions and relative positions generally.

In liquid level or position indicators which have been heretofore used for indicating or controlling liquid level or the like, a float or other position responsive element has been generally connected to and operatively associated with a leverage or linkage system including a variety of pivoted or fulcrumed parts, diaphragms and other mechanical, electrical or hydraulic operating mechanisms. These appendages to the float or other position responsive element have of necessity put a considerable load on the free movement of the element thereby reducing its sensitivity to movement and its constancy of operation. Also in many installations the afore-mentioned appendages are submerged in liquid or fluid and are subject to corrosion, rusting and leakage. The wear and deterioration of such connected mechanisms leads to a comparatively early failure of satisfactory operations of the liquid level or position indicator. In addition the movement of the float or other position responsive device is usually translated through a reducing mechanism to the indicating, measuring or control device so that the available change of movement or condition at such device is very much less than the movement of the float or position responsive element.

In accordance with the present invention and as a principal object thereof, we provide a device of the character described which is so designed and constructed as to be responsive to the movement of a free, buoyant float or other position responsive element which is completely unencumbered in its ability to freely rise and fall with the level of the liquid in which it is supported and wherein there is no inhibiting mechanical connection of the type above described between the float and other parts of the device.

Another object of the invention is to provide a device of the character above in which all mechanical connections, linkages, diaphragms and the like which have been heretofore used are completely eliminated whereby all failures due to wear, rusting, corrosion, leakage and the like are avoided.

A further object of the invention is to provide a device of the character described in which the position responsive elements may be completely contained and sealed in a closed vessel, and in which such elements are designed and constructed to withstand either high or low pressures within the vessel and to be resistant to fluids which may be contained in the vessel.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by said drawings and description may be adopted within the scope of the invention as set forth in the claims.

With reference to said drawings:

Figure 1 is a longitudinal sectional view of a position indicator device incorporating the present invention.

Figure 2 is a cross sectional view of the device taken substantially on the plane of line 2—2 as shown in Figure 1.

Figure 3 is a developed view of the armature used in the device as illustrated in Figures 1 and 2.

Figure 4 is a diagrammatic view showing the arrangement of the induction winding and its magnetic field.

Figure 5 is a diagrammatic view showing a complete electric circuit incorporating the present invention.

Figure 6 is a longitudinal sectional view showing a modified form of the invention.

Figure 7 is a cross sectional view of the device shown in Figure 6 and is taken substantially on the plane of line 7—7 of Figure 6.

Figure 8 is a developed view showing the arrangement of extensions on the pole pieces used in the device illustrated in Figure 6.

The device as illustrated in the accompanying drawing consists briefly of an inductance winding 11 of elongated form and wound with a different number of turns per unit of length at different portions of its length; an electric circuit, such as shown in Figure 5, for energizing the winding 11 and including a current measuring or other electrical responsive device 12; and means 13 positioned in electrical coupled relation to the winding and movable relative thereto, so as to provide upon such relative movement, the coupling by such means of different number of turns of the winding to thereby change the inductance of the winding and correspondingly change the response of device 12.

For convenience in manufacture and also for effectiveness of operation, we prefer to construct the winding 11 of a plurality of coils 11a, wound or positioned in contiguous relation on a centrally arranged iron core 14. The core and coil assembly may be of any desired configuration such as circular, or other curved or polygonal shape, along which relative position determination is desired, although for purposes of present disclosure, a straight line arrangement is shown.

In the course of operation of the device, the coils 11a are energized with an alternating electric current whereby a magnetic field is established in the core 14 and in and around the coils, and as aforesaid the operation of the device depends upon the interaction of the means 13 with this magnetic field at different portions of the length of the winding. In the form of the device here illustrated the means 13 surrounds the coils 11a and thus it is desirable to cause the flow of magnetic flux outwardly from the core and the coils. To promote this effect, we mount on the core 14 between each adjacent pair of coils 11a, a pole piece 16. The latter, in the form of the invention here illustrated, are of disc shape, apertured centrally to fit the periphery of the core, and extend radially therefrom in a plane transverse to the axis of the core. Preferably the pole pieces are formed with a radial slot 17 which may be opened slightly to facilitate mounting on the core 14, and desirably the pole pieces are also formed with peripheral notches 18 to receive the wires connecting adjacent coils and the electrical circuit.

To further promote the flow of magnetic flux out from and around the individual coils 11a, the latter are so wound that the flow of magnetic flux in the core at adjacent coils is in opposite directions. This is accomplished by winding the sequence of the turns in adjacent coils in reverse directions, such as indicated diagrammatically in Figure 4. In this manner, viewed as an instantaneous condition, the pole pieces 16 are alternate north and south poles, as indicated in Figure 4, of individual magnetic circuits around the coils 11a, to thus induce the desired circulation of flux in such circuits as shown by arrows 19.

Preferably the core 14, winding 11 and pole pieces 16 are encased and sealed within a sheath or tube 20 so that the internal parts may be completely sealed off from the liquids or fluids within which the device is adapted to operate. In a liquid level application as illustrated in the accompanying drawings, the closed bottom end 22 of the sheath may be supported on a mounting bracket 23 in the bottom of a vessel 24. The opposite end of the tube may be extended through an aperture 26 in the top of the vessel so as to project the upper end portion 27 of the tube outside of the vessel 24 for convenient access to the electrical conductors in the tube. A conventional type outlet box 28 is here shown at the top of the tube for assisting in the making of appropriate electrical connections. A collar 29 may be fastened to the tube and the top of the vessel so as to seal the tube in the vessel.

In accordance with the present invention the magnetic flux generated by the winding 11 is required to pass through the sheath 20 for interaction with the means 13, which in the present embodiment of the invention is mounted at the outside of the sheath 20. Accordingly the sheath is made of any desired relatively non-magnetic material. Also since it will be noted that the sheath 20 surrounds the magnetic field and therefore forms a shorted turn in such a field, it is desired that the sheath have a relatively high coefficient of electrical resistance. The range of materials usable in the sheath 20 is practically unlimited within the general limitations enumerated and accordingly the material used may be selected within wide ranges to accommodate the device to the requirements of the installation. Any of the following materials may be used: non-magnetic steels, such as stainless steel (high content nickel-chromium steel), copper-nickel, brass alloys, rubber, plastics, glass, ceramics, wood, paper, and the like.

In the preferred form of the invention, the change in strength of the magnetic field along the length of the device is obtained by winding the individual coils 11a of different numbers of turns. In certain installations some electrical conductivity in the sheath may be desired to establish circulating currents in the sheath along the length of the device so as to heat the sheath when in contact with certain melting point materials and to otherwise produce a desired mutual inductance effect.

The means 13 as above noted is mounted around the sheath 20 and is adapted for movement longitudinally of the device within the magnetic field above discussed. The function of the means is to interact with this magnetic field so as to increase the electrical inductance of that portion of the winding 11 which is in juxtaposition to the means 13. This effect can be accomplished by the interpositioning in the magnetic field of either a shorted turn so as to set up a mutual induction effect, or by the positioning in such a field of an armature of high magnetic permeability which reduces the reluctance of the path of magnetic flux thereby increasing the flux density in the adjacent coil and increasing the reactance of the coil. In the present form of the invention both of these interactions are used to some extent.

In the form of the invention illustrated in Figure 1 of the drawings, the device is adapted for use as a liquid level indicator and the means 13 is incorporated in the form of a float 31 which is adapted to follow the level of liquid contained in the vessel 24. As will be seen from the drawings the float 31 is formed with a tubular center section 32 which surrounds the sheath 20 in a relatively loose sliding relation thereto. The float 31 is also provided with an outwardly extending side wall section 33 which is joined to the opposite ends of the center float section 32 so as to provide a hollow fluid tight enclosure. The float may be made of any desired material which is both liquid tight and resistant to corrosion, rusting or chemical reaction with the liquid in the vessel with which it is used. Also the electrical resistance of such material can be selected over relatively wide ranges so as to provide the desired shorted-turn, mutual induction effect above discussed.

Sealed within the float 31 and here shown mounted against the central section 32 of the float, is a magnetic armature 34. The magnetic flux generated by that portion of the winding 11 in juxtaposition to the float passes through the core, pole pieces, the sheath 20, the air gap, and through the center section 32 of the float to the armature 34. The flux may then move longitudinally through the armature 34 and return through the center section of the float, the air gap, the sheath 20, the pole pieces to the core, thus completing the magnetic circuit.

Since the flow of magnetic flux is concentrated in the pole pieces 16, such as illustrated in Figure 4, the greatest change brought about by the movement of the armature longitudinally of the device, would normally occur as the armature was moved to or away from one of the pole pieces. To minimize this effect the axial length of the armature should cover at least three pole pieces. In addition the circumferential extent of the armature adjacent its opposite ends is here reduced so that the effect of the armature in approaching or receding from a pole piece is correspondingly reduced.

This shape of the armature is best illustrated in Figure 3 of the drawing where a developed view of the armature is shown. With reference to Figure 3 it will be noted that the upper and lower ends of the armature are provided with saw tooth portions. When the blank such as illustrated in Figure 3 is rolled to a cylindrical shape about its central axis 37, the portions 36 form longitudinally extending tapered points, spaced approximately equally about the circumference of the armature. The provision of a plurality of these points symmetrically around the periphery of the armature serves to keep the effect of the armature substantially constant when in concentric and eccentric relation to the pole pieces.

The basic principle of operation of the device should now be clear and may be summarized. The winding 11 is wound with a different number of turns per unit of length at different portions of its length and in the preferred embodiment the smallest number of turns per inch appears in one of the coils 11a at one end of the winding and the greatest number of turns per inch appears in one of the coils 11a at the opposite end of the winding, and the intermediate coils 11a are wound with successively graduated number of turns per inch. The winding is energized by a suitable alternating current by means of an electrical circuit containing a current measuring or other electrical responsive device. Due to the arrangement of the winding, a graduated magnetic field is set up along the length of the device. The interaction of the means 13 with this magnetic field increases the reactance of that portion of the winding which is in juxtaposition to the means 13. Thus if the means 13 is positioned opposite the end of the winding having the least number of turns per inch, the increase in reactance of the winding reflected in the electrical circuit will be small. As the means 13 is moved longitudinally along the winding, the increase of reactance of the winding becomes greater until the maximum increase in reactance is obtained when the means 13 reaches the opposite end of the winding containing the greatest number of turns per inch. This change in reactance of the winding is of course accompanied by a corresponding change in the magnitude of the electrical current in the accompanying electrical circuit, and this change of current can be reflected on a meter to indicate the position of the means 13 along the length of the winding, or the change in current can be caused to operate an appropriate electrical responsive device such as a relay, magnetic valve or the like. Where the latter type of responsive device is used, the present invention can be used as an automatic-control apparatus for maintaining a constant liquid level or maintaining a constancy of relative position between any two members or devices which may be appropriately associated with the winding 11 and the means 13.

The operating effect above discussed can be very greatly increased by forming the winding 11 of two complete windings 38 and 39 such as illustrated diagrammatically in Figure 5 and connecting these windings in a bridge circuit such as illustrated in Figure 5 so that the changes in reactance in the windings occasioned by the displacement of the means 13, will be additive in affecting the response of the meter or other device 12. The windings 38 and 39 are wound together as primary and secondary windings about the core 14 and are for reasons above discussed broken up into a plurality of coils 38a and 39a located between the pole pieces 16. Starting at one end of the device, the first coil of winding 38 will have the least number of turns of any of the other coils forming the winding 38. The successive coils forming the winding 38 will each have an increasingly greater number of turns. The last coil of winding 38 at the opposite end of the device will have the greatest number of turns. Winding 39 is oppositely arranged in that the coil of winding 39 which is wound together with the first mentioned coil of winding 38, will have the greatest number of turns of any of the coils forming winding 39. The successive coils of winding 39 will have successively decreased number of turns so that the last coil of winding 39 at the opposite end of the device will have the least number of turns of any coil of winding 39. Also as an important feature of this arrangement, the coils 38a and 39a which are wound together as primary and secondary windings around the core 14, are so wound that the magnetic flux generated by the coils will be in the same direction so as to be additive. Desirably the sum of the turns in the primary and secondary windings of each coil section is substantially the same so that the flux density at each of the pole pieces is substantially the same. The mutual inductance effect of this primary and secondary arrangement of the windings 38 and 39 serves to further increase the unbalance in the bridge circuit due to the magnetic coupling between these windings.

In the arrangement discussed in the preceding paragraph, the movement of the armature 13 to one end of the device will produce a maximum increase in the reactance of one of the windings, say winding 38, and a maximum decrease in the reactance of the other winding 39. On the other hand, the movement of the armature to the opposite end of the device will produce a maximum increase in the reactance of winding 39 and a maximum decrease in the reactance of winding 38. The circuit arrangement as shown in Figure 5 has been designed to take advantage of this reverse change in the reactance of the two windings 38 and 39 so that the change is additive. With reference to Figure 5, the ends 41 and 42 of the windings 38 and 39 at one end of the device are connected by conductors 43 and 44 to the opposite end of a secondary winding 46 of a voltage step-down transformer 47. The primary winding 48 of the transformer 47 is adapted for connection to any suitable source of alternating electric potential such as the usual 110 volt alternating current outlet. A potentiometer 49 is bridged across the center of the secondary winding 46, and the moving arm 51 of the potentiometer 49 is connected to a rheostat 52 which is in turn connected to one side of the meter 12. The opposite side of the meter 12 is connected by conductor 53 to the ends 54 and 56 of the windings 38 and 39 opposite to the first mentioned ends 41 and 42.

The transformer 47 is incorporated in the circuit illustrated in Figure 5 because it is usually desirable to energize the circuit with a voltage somewhat reduced from the usual 110 volt source. However, it will be understood that the windings 38 and 39 may be adapted for operation at other voltages equal to or substantially greater than 110 volts. In the latter case, the transformer 47 may be eliminated and the source voltage applied directly to the winding 46, or a step-up transformer may be used to energize the circuit with a voltage higher than that of the source.

In the circuit arrangement illustrated in Figure 5, the voltage appearing across the meter 12 depends upon the degree of unbalanced of the bridge. If the two windings 38 and 39 are identical with a uniform variation in turns per inch from one end to the other, and so would that the heavy end of one is over the light end of the other, the impedance of the two legs of the bridge will balance and the voltage across the meter will be zero if the potentiometer arm 51 is moved to the center voltage of the secondary winding 46. Now if the armature 13 is inserted in the magnetic field of the windings, it will increase the reactance of the coils adjacent to it. This increase will be greater for the coil section having the greater number of turns. Thus the presence of the armature 13 will cause an unbalance of the bridge and a resultant voltage across the meter. As the armature is moved along, the voltage across the meter will vary as the ratio between the turns on the coils under the armature, being zero in the position of the armature centrally of the length of the device where the turns on each coil are the same, and maximum at each end where the turn ratio is maximum. By moving the arm 51 of the potentiometer 49, so as to relatively increase and decrease the voltages applied to the two legs of the bridge, the bridge can be brought into balance at any longitudinal position of the armature. Usually the potentiometer is adjusted so as to bring the bridge to a balanced condition with the armature located at one end of the device, when the meter 12 will be at its zero position. The movement of the armature along the length of the windings will then cause a uniform increase in the voltage across the meter, reaching a maximum at the opposite end. Under such conditions, the meter may be calibrated to show the exact position of the armature along the length of the device. In a liquid level adaptation of the invention as here shown, the meter may be calibrated in gallons, or feet, or the like.

The function of the rheostat 52 is to adjust the full scale deflection of the meter in relation to the amount of movement of the armature to be measured.

As has been hereinabove noted the meter 12 may be replaced by a relay, magnetic valve, electric motor, or other form of electric responsive device so as to permit the adaptation of the present invention to automatic control apparatus.

A modified form of the invention has been illustrated in Figures 6, 7 and 8 of the drawing wherein the uniform change in reactance of the windings upon a uniform movement of the means 13' is accomplished by shaping the pole pieces 16' instead of the armature 34' as in the first described embodiment. As shown in these figures the pole pieces are formed with a plurality of extensions 57 which extend in opposite directions longitudinally from a peripheral flange 58 formed on each of the pole pieces. The developed shape of the extensions 57 is shown in Figure 8 of the drawing wherein it will be noted that three of such extensions are secured to the periphery of each pole piece in circumferentially spaced relation thereon and that such extensions are tapered away from their connection to the pole piece. As here shown, the tapered points 59 of the extensions 57 extend longitudinally in opposite directions from the pole piece on which the extension is supported to adjacent the next longitudinally spaced pole piece. In this manner there is a complete interleaving of the distribution of magnetic flux along the length of the device. Because of this effect, the length of the armature 34' may be reduced so as to cover only one coil section 11a' of the device.

Also in the form of the device illustrated in Figures 6, 7 and 8, and as best shown in Figures 7 and 8, the tapered end points 59 of the extensions 57 of alternate pole pieces 16', may be brought together and joined at the transverse plane of the intermediate pole piece. As illustrated in Figure 7 the intermediate pole piece 16' is formed with peripheral cut out portions or notches 61 so as to clear the end points 59 of the adjacent extension pieces 57. Thus in the construction illustrated there is an actual point engagement between alternate north poles (denoted by the letter N in Figure 8), and likewise a point engagement between alternate south poles (denoted by the letter S in Figure 8) of the magnetic circuit. It will be noted however that the pole pieces 16' and their extensions 57 are so shaped and constructed so as to at all times preserve an adequate spacing between alternate north and south poles. This spacing should be somewhat greater than the spacing between the extensions 57 and the armature 34' so as to induce the maximum flow of flux through the latter.

We claim:

1. A position indicator comprising, an elongated inductance winding composed of a plurality of substantially contiguous coils having progressively different number of turns per unit of length, a magnetic armature surrounding said winding and movable longitudinally thereof into juxtaposition with each of said coils, the adjacent coils of said winding being reversely wound so as to produce opposing movement of magnetic flux axially of such adjacent coils to thereby induce the flow of flux into the area surrounding said coils traversed by said armature.

2. A position indicator of the type described in claim 1 having a magnetic core positioned centrally through said coils, and a plurality of pole pieces connected to said core and extending radially therefrom between adjacent ends of said coils.

3. A position indicator of the character described comprising, an elongated core member of low magnetic permeability, a plurality of pole pieces mounted on said core member at longitudinal spaced positions thereon and extending radially therefrom, a plurality of coils mounted on said core member between said pole pieces, said coils being of unequal number of turns, a tubular sheath surrounding said coils and pole pieces, said coils being connected in series with alternate coils wound in reverse directions so as to produce an opposition of magnetic flux in said core member at adjacent coils and the inducing of such magnetic flux through said pole pieces and into the space surrounding said sheath, and an armature surrounding said sheath and movable longitudinally thereof through the aforedescribed magnetic field.

4. A position indicator as characterized in claim 3 wherein the electrical resistance of said sheath is such as to establish within said sheath a relatively small circulating electrical current.

5. A position indicator as characterized in claim 3 wherein said longitudinal ends of said armature are tapered to better graduate the magnetic effect produced upon movement of said armature to and over and from said pole pieces.

6. A position indicator as characterized in claim 3 wherein said pole pieces are provided with tapered longitudinal extensions functioning to better graduate the magnetic effect produced by the movement of said armature to and over and from said pole pieces.

7. A position indicator comprising, a pair of windings each having a different number of turns per unit of length over different portions of its length and wound together with the greater number of turns of one winding superimposing the lesser number of turns of the other winding, and an armature surrounding said windings in the magnetic field thereof and movable longitudinally of said windings to change the reactance thereof and change the balance of said steady state currents.

8. A position indicator comprising, an elongated magnetic core, a plurality of pole pieces mounted on said core in longitudinally spaced position and extending radially from said core, a first winding consisting of a plurality of coils of different number of turns positioned on said core between said pole pieces, a second winding consisting of a plurality of coils of different number of turns positioned on said core between said pole pieces, the coils of said windings having a different number of turns being wound together in mutually coupled relation and the adjacent pairs of coils being wound in reverse directions so as to produce an opposition of magnetic flux in said core at said adjacent coils inducing the flow of magnetic flux outwardly through said pole pieces, and a magnetic armature surrounding said coils and pole pieces and adapted for movement longitudinally therealong.

9. A device of the character described comprising, an elongated magnetic core, a plurality of disc shaped pole pieces mounted on said core in longitudinal spaced relation thereon and extending radially therefrom, a winding composed of plurality of series connected inductance coils mounted on said core and separated from each other by said pole pieces and progressively varying in number of turns with the coil of maximum turns adjacent one end of the core and the coil of minimum turns adjacent the opposite end of said core, said coils being alternately wound in reverse directions to produce alternate polarity of said pole pieces and the inducing of flow of magnetic flux through said pole pieces perpendicular to said core and into the space surrounding said coils, and electrical coupling means surrounding said pole pieces and movable axially along said core relative to said pole pieces so as to progressively change the reactance of said winding as a function of such movement.

10. A device of the character described comprising, an elongated magnetic core, a plurality of coils mounted in longitudinally spaced relation on said core and each composed of primary and secondary windings in mutually coupled relation and wound in the same direction for additive generation of magnetic flux in each coil with adjacent coils reversely wound to induce a radial flow of flux between said coils and around the exterior of said coils, magnetic pole pieces mounted on said core between each adjacent pair of coils to assist said last mentioned flux flow, the primary windings being series connected and progressively varying in number of turns from coil to coil with the maximum number of turns in the coils adjacent one end of said core and the minimum number of turns in the coil adjacent the opposite end of said core, said secondary windings being series connected and progressively varying in number of turns from coil to coil with the maximum number of turns in the coil containing the minimum number of primary turns and with the minimum number of secondary turns in the coil containing the maximum number of primary turns, and electrical coupling means surrounding said pole pieces and movable axially of said core relative to said pole pieces so as to progressively and inversely change the reactance of said windings as function of such movement.

WILLIAM. J. JAMES.
WALTER G. BAYHA.

REFERENCES CITED

The following references are of record in the file of this patent:

UNITED STATES PATENTS

| Number | Name | Date |
|---|---|---|
| 1,610,179 | Thompson | Dec. 7, 1926 |
| 1,671,106 | Fisher | May 29, 1928 |
| 1,746,105 | Clench et al. | Feb. 4, 1930 |
| 2,394,079 | Langer | Feb. 5, 1946 |
| 2,424,766 | Miner | July 29, 1947 |

FOREIGN PATENTS

| Number | Country | Date |
|---|---|---|
| 424,769 | Great Britain | Feb. 28, 1935 |
| 820,993 | France | Aug. 17, 1937 |
| 453,157 | Germany | Nov. 29, 1927 |
| 692,455 | Germany | June 20, 1940 |